(12) United States Patent
Kelmartin et al.

(10) Patent No.: US 8,187,733 B2
(45) Date of Patent: *May 29, 2012

(54) ARCHITECTURAL FABRIC

(75) Inventors: Thomas Kelmartin, West Chester, PA (US); Greg Rusch, Newark, DE (US)

(73) Assignee: W. L. Gore & Associates, Inc., Newark, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/851,695

(22) Filed: Sep. 7, 2007

(65) Prior Publication Data

US 2008/0032576 A1 Feb. 7, 2008

Related U.S. Application Data

(63) Continuation-in-part of application No. 11/195,911, filed on Aug. 2, 2005, now Pat. No. 7,501,356.

(51) Int. Cl.
*B32B 5/02* (2006.01)
*B32B 5/16* (2006.01)

(52) U.S. Cl. ............ 428/913; 442/85; 442/136; 442/73; 442/74

(58) Field of Classification Search .................. 442/394, 442/136, 85, 73–74
See application file for complete search history.

(56) References Cited

U.S. PATENT DOCUMENTS

| | | | |
|---|---|---|---|
| 3,513,064 A | 5/1970 | Westley | 161/92 |
| 3,953,566 A | 4/1976 | Gore | 264/288 |
| 4,670,503 A | 6/1987 | Neumann et al. | 524/520 |
| 4,770,927 A | 9/1988 | Effenberger et al. | 428/245 |
| 4,943,473 A | 7/1990 | Sahatjian et al. | 428/245 |
| 4,946,736 A | 8/1990 | Sassa | 428/245 |
| 5,230,937 A | 7/1993 | Effenberger et al. | 428/113 |
| 5,262,234 A | 11/1993 | Minor et al. | 428/372 |
| 5,264,276 A | 11/1993 | McGregor et al. | 428/252 |
| 5,275,887 A | 1/1994 | Johnson et al. | 428/422 |
| 5,357,726 A | 10/1994 | Effenberger et al. | 52/309.7 |
| 5,358,780 A | 10/1994 | Kafchinski | |
| 5,401,901 A | 3/1995 | Gerry et al. | 174/35 |
| 5,433,996 A | 7/1995 | Kranzler et al. | 428/247 |
| 5,571,605 A * | 11/1996 | Abrams et al. | 442/195 |
| 5,759,924 A | 6/1998 | Sahlin | 442/60 |
| 5,814,405 A | 9/1998 | Branca et al. | 428/311.51 |
| 5,916,659 A | 6/1999 | Koerber et al. | 428/86 |
| 6,071,452 A | 6/2000 | Kelmartin, Jr. et al. | 264/230 |
| 6,517,919 B1 | 2/2003 | Griffin | 428/36.1 |
| 6,770,577 B2 * | 8/2004 | Kelmartin et al. | 442/86 |
| 7,163,601 B2 | 1/2007 | Kelmartin et al. | 156/333 |
| 7,501,356 B2 * | 3/2009 | Kelmartin et al. | 442/86 |

(Continued)

FOREIGN PATENT DOCUMENTS

DE 20 2004 020048 3/2005

(Continued)

OTHER PUBLICATIONS

Supplemental European Search Report EP 06 78 8081. International Search Report dated Sep. 28, 2011 for PCT/US2011/020662.

*Primary Examiner* — Lynda Salvatore
(74) *Attorney, Agent, or Firm* — Allan M. Wheatcraft

(57) ABSTRACT

An article useful as an architectural fabric consisting of (a) a layer of fabric having a first surface and a second surface made of expanded polytetrafluoroethylene fibers that are densified or contain a filler or both; and (b) a fluoropolymer coating disposed on at least the first surface of the fabric.

12 Claims, 2 Drawing Sheets

U.S. PATENT DOCUMENTS

| | | | |
|---|---|---|---|
| 2004/0219851 A1 | 11/2004 | Sahlin et al. | 442/254 |
| 2005/0143508 A1* | 6/2005 | Tyagi et al. | 524/423 |
| 2006/0234575 A1 | 10/2006 | Salitsky | |
| 2007/0032152 A1 | 2/2007 | Kelmartin et al. | 442/88 |
| 2008/0032576 A1 | 2/2008 | Kelmartin et al. | |

FOREIGN PATENT DOCUMENTS

| | | |
|---|---|---|
| EP | 0 202 996 A | 11/1986 |
| WO | WO 92 /09429 A | 6/1992 |
| WO | WO 00 02639 | 1/2000 |
| WO | WO 01/96695 | 12/2001 |

* cited by examiner

ARCHITECTURAL FABRIC

RELATED APPLICATIONS

This application is a continuation-in-part of U.S. application Ser. No. 11/195,911, now U.S. Pat. No. 7,501,356, filed Aug. 2, 2005.

FIELD OF INVENTION

The present invention relates to fabric and, more particularly, to architectural fabric that is waterproof, fire retardant, flexible, durable, and aesthetically pleasing.

BACKGROUND OF INVENTION

Architectural fabric is fabric used as a building structure or part of a building structure. It typically provides protection for humans from elements such as wind, sun, and rain. It may be a permanent structure or a temporary one. If temporary, it may be retractable or removable, for example by folding, rolling, or otherwise storing.

There are several requirements for architectural fabric. It must be strong enough to withstand wind and other stresses during assembly and use. It must be flexible and durable, so that it can be folded or rolled and its strength and integrity are maintained over time. It must be UV light resistant. UV light tends to degrade and weaken fabric over time. A fabric that is UV resistant will stand up under this exposure. It should generally be fire retardant and waterproof. It should be easily seamed (or "welded"). It must also be aesthetically pleasing.

A known architectural fabric is a composite consisting of fiberglass fabric coated with PTFE. Although this product has certain desirable qualities, it is not suitably flexible. The fabric thus cannot be used efficiently in applications where convenient removal of the fabric is needed.

Another known architectural fabric has a coating of PVC or acrylic on polyester fabric. These products have flexibility but only limited durability. Unless specially treated, these fabrics are flammable and tend to degrade under UV light. After a certain amount of flexing and UV exposure, these products develop cracks or other imperfections that allow water to penetrate the fabric at the point where it has been compromised.

Another known architectural fabric is that disclosed in U.S. Pat. No. 6,770,577B2 to Kelmartin et al. The article disclosed therein comprises a polytetrafluoroethylene fabric attached to at least one composite membrane of a porous polytetrafluoroethylene film having a fluoropolymer adhesive (such as THV) contained in its pores. The porous polytetrafluoroethylene film is provided to make the article durable and aesthetically pleasing. Addition of the film requires additional processing, however. The film also tends to mute any pigments or colors in the fabric or the THV.

A limitation of known architectural fabrics made of polytetrafluoroethylene fiber is that certain substances can be absorbed through wicking into the polytetrafluoroethylene fiber. Examples of such substances are silicone oil, hydrocarbon oil, and isopropyl alcohol. Certain surfactants have the capability of lowering the surface tension of water which makes it also possible for water to then wick into the porous polytetrafluoroethylene fibers. Once liquids are absorbed into the fibers of the fabric, undesirable color and/or light transmission variations can result.

An economical, weldable, waterproof, fire retardant architectural fabric is needed in the industry, which does not become discolored or have altered light transmission properties after exposure to water or other liquid contaminants.

SUMMARY OF INVENTION

The present invention provides an article consisting of (a) a layer of fabric having a first surface and a second surface made of polytetrafluoroethylene fibers; and (b) a fluoropolymer coating disposed on said first surface of said fabric. In another embodiment, the invention further includes a fluoropolymer coating disposed on the second surface of the fabric. The fluoropolymer coating is preferably THV. The article of the present invention is preferably waterproof, fire retardant, and has high seam strength. It is also preferably an architectural fabric for retractable, temporary, or permanent structures, such as tensile structures, and is adapted to be joined to itself by welding.

In another aspect, the present invention provides a method of making an architectural fabric for a retractable, temporary, or permanent structure by:
(a) providing a layer of fabric having a first surface and a second surface and comprising polytetrafluoroethylene fibers;
(b) disposing THV on the first surface of said fabric; and
(c) optionally disposing THV on the second surface of said fabric.

In another aspect, the invention provides a method of making an architectural fabric comprising the steps of
(a) providing a fluoropolymer fabric
(b) extrusion coating the fluoropolymer fabric with THV by simultaneously extruding the THV onto the fabric and nipping the fabric and extruded THV between a first roll and a second roll.

Preferably, the present invention provides an architectural fabric as described above wherein the polytetrafluoroethylene fibers contain an additive, such as $TiO_2$. Also preferably, the present invention provides an architectural fabric as described above wherein the polytetrafluoroethylene fibers are densified expanded polytetrafluoroethylene. In the most preferred embodiment the architectural fabric is woven from densified expanded polytetrafluoroethylene fibers which also contain an additive, such as $TiO_2$.

BRIEF DESCRIPTION OF INVENTION

DETAILED DESCRIPTION OF INVENTION

Figure 1:
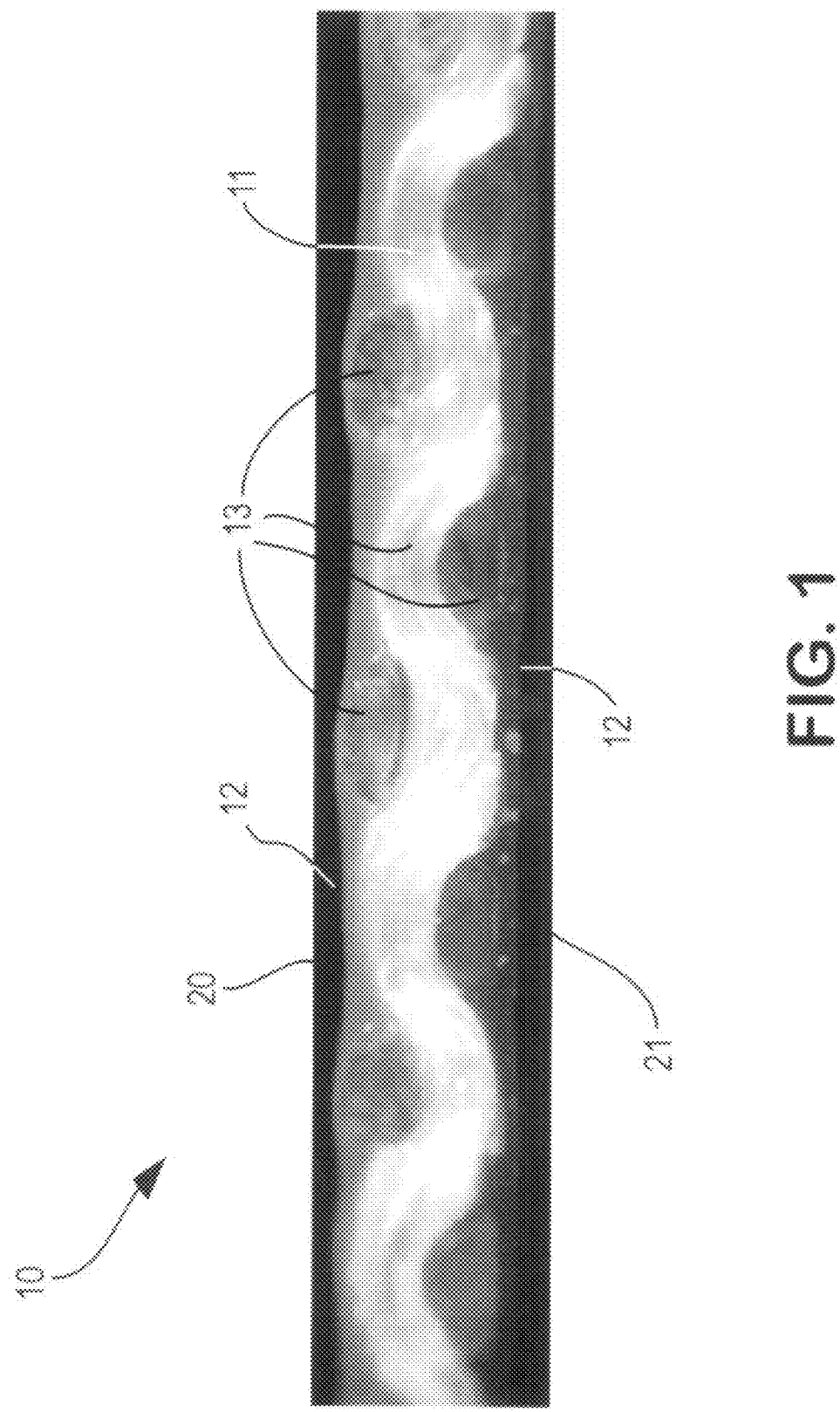
FIG. 1 is an optical micrograph of a cross-section of an article in accordance with an exemplary embodiment of the present invention.

The present invention will now be described with reference to the figures in the drawing. FIG. 1 is an optical micrograph of a cross-section of an article 10 according to an exemplary embodiment of the present invention. In this exemplary embodiment, article 10 is an architectural fabric. Article 10 includes a fabric 11 made of fibers 13 of a fluoropolymer material, preferably PTFE fibers that have sufficient strength for a particular application, and most preferably expanded PTFE fibers. Fabric 11 has a warp and a weft direction, accounting for the cross-sectional views perpendicular to and parallel to the axes of the individual fibers of fabric 11 shown in FIG. 1.

Fabric 11 has a first surface 20 and a second surface 21. Disposed adjacent to first surface 20, which extends along fibers 13 in both the warp and weft direction, and extending in between and among fibers 13 is a fluoropolymer coating 12, preferably a terpolymer of tetrafluoroethylene, hexafluoropropylene, and vinylidene fluoride (THV).

Article 10 is useful as an architectural fabric with only first surface 20 covered by fluoropolymer coating 12. A preferable embodiment, however, also has fluoropolymer coating 12 disposed on second surface 21 (and extending between and among fibers 13 from such second surface 21).

Fabric 11 is any material that is UV light resistant and fire retardant. It must also be strong, flexible and durable. PTFE fiber is preferred. Fabric made from expanded polytetrafluoroethylene fibers is most preferred.

Fluoropolymer coating 12 is a material that is UV light resistant and fire retardant. THV is preferred. This preferred fluoropolymer coating is also advantageously flexible, adherent to the fabric 11 (without being limited by theory, it is believed that the THV is able to encapsulate the fibers of fabric 11 to form a mechanical bond rather than a chemical bond) and clear or translucent. Preferably, the coating on both sides of the fabric is the same material. THV can be filled for functionality, such as color, UV resistance (if needed, for example if no PTFE fabric is used), and flame resistance.

Figure 2:
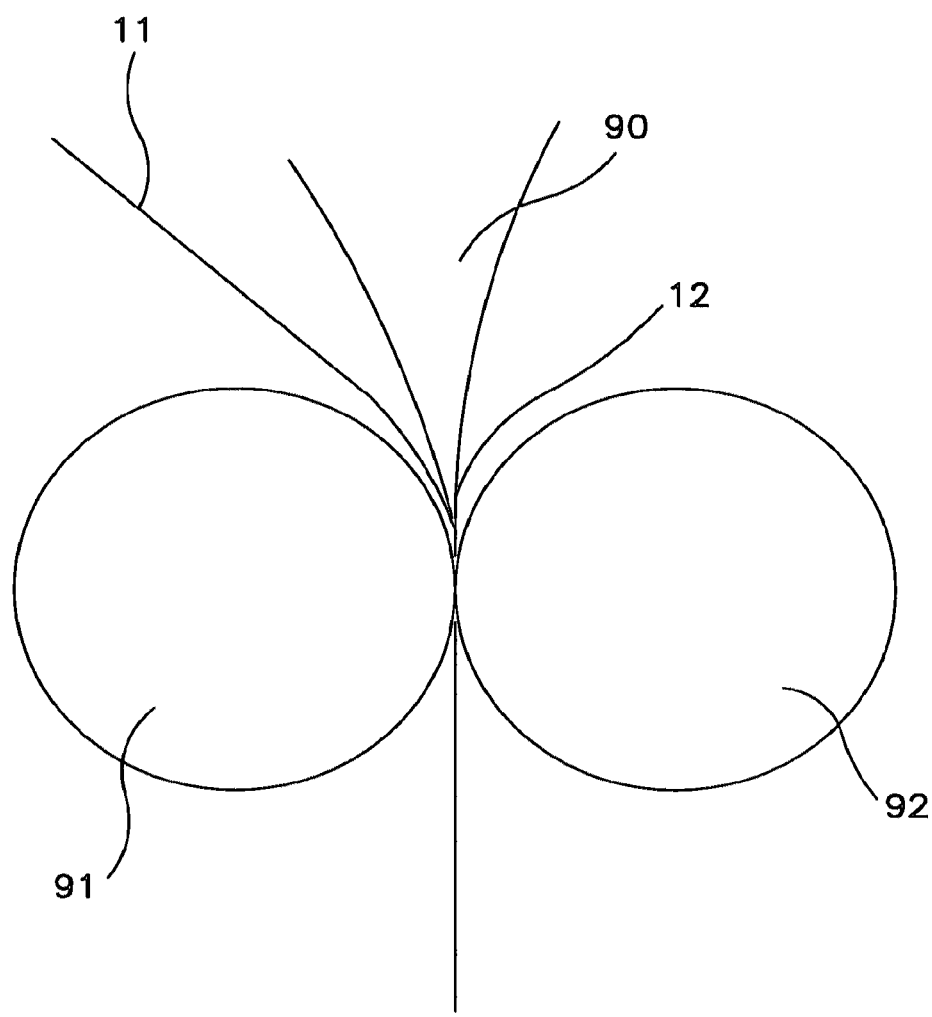
FIG. 2 is a schematic illustration of an exemplary process for making an article according to the present invention.

Fluoropolymer coating 12 is preferably applied to fabric 11 by extrusion coating, although other methods, such as solvent coating or lamination with or without the use of release layers are alternatives. FIG. 2 depicts a preferred extrusion coating process for making the architectural fabric of this invention. Fabric 11 is passed between rolls 91 and 92 while fluoropolymer coating 12 is simultaneously extruded onto fabric 11 from extruder 90. The surfaces of rolls 91 and 92, as well as the temperature and speed of the rolls are critical processing parameters for making the present invention. Details of these parameters are given in the example below.

Surprisingly, Applicant has discovered that the article of the present invention functions well as an architectural fabric. Contrary to the conventional wisdom expressed in U.S. Pat. No. 6,770,577B2 to Kelmartin et al., Applicant has discovered that an architectural fabric made without the PTFE film disclosed in Kelmartin is durable, processable and aesthetically pleasing. As stated in this patent, "[w]hen THV alone is used to coat the fabric, the surface has a blotchy appearance that is tacky. With the inventive article, however, the surface appears uniform and is not tacky. This also provides unexpected improvements in processability. The article does not stick to or coat processing rolls during manufacture," It was thus conventional wisdom before the present invention that elimination of the porous polytetrafluoroethylene film would be undesirable.

Also surprisingly, article 10 can be much more easily seam-sealed to itself using welding techniques known in the art of seam-sealing for example, with PTFE/fiberglass fabrics. This is a result of the elimination of the microporous PTFE element described in U.S. Pat. No. 6,770,577B2. A variety of seaming techniques can be used. A secure seam is formed by applying heat (about 230 degrees C. for 45 seconds) and pressure to overlapped portions of the inventive fabric. A suitable seam sealing device is an electric impulse hot bar welder available from Aline Heat Sealing Corporation, Cerritos Calif., part number HD-25. Surprisingly, radio frequency welding can also be used, as can wedge welding and hot-air welding. Using the invention, one can easily get a strong weld without the need for special processing, or for adding additional adhesives or seam tape as with other fabrics currently used.

The fabric 11 of article 10 is woven from fibers 13 of a fluoropolymer material, preferably PTFE fibers that have sufficient strength for a particular application, and most preferably expanded PTFE fibers. Expanded PTFE fibers have a porous structure. As used herein, "porous" means having interconnected passages and pathways. These porous expanded PTFE fibers can experience changes in optical properties such as color and light transmission when certain liquids are absorbed into the porous structure of the fiber. For example, the light transmission of an expanded PTFE fiber will significantly increase when isopropyl alcohol, silicone oil, or water in combination with surfactants, are absorbed by the fiber.

The inventors have discovered that this undesirable effect can be avoided by adding to the fiber an additive (otherwise referred to herein as a "pigment" or "filler"). This prevents or reduces the change in color or light transmission upon ingress of fluids. One preferable filler is titanium dioxide ($TiO_2$). The criteria for a desirable pigment for use in architectural fabric are that it be non-combustible, have a refractive index substantially different than PTFE, be non-fading, white or desired color value, have a temperature stability to a minimum of 400 C, and be compatible with expanded PTFE manufacturing process as taught in U.S. Pat. No. 3,953,566.

The inventors have also discovered that this undesirable effect can be avoided by an alternative embodiment of the invention in which an essentially non-porous expanded PTFE fiber which has little or no void volume by which to absorb certain liquids is used. In this way, the ingress of fluids is prevented, thereby preserving the color and light transmission of the fabric. In the most preferred embodiment, an essentially non-porous (otherwise referred to herein as "densified") expanded PTFE fiber is used in combination with an additive in the fiber.

Without being limited by theory, the inventors believe that the expanded PTFE fiber has a native ability to scatter light. When a liquid is absorbed into the expanded PTFE the native ability of the expanded PTFE fiber to scatter light can be reduced. The filler acts to scatter or absorb light in addition to the native ability of the expanded PTFE and should be chosen to show less effect by the absorbed liquid than the expanded PTFE. The addition of a filler can thus result in reduced change in optical properties upon absorbtion of a liquid. The change in optical properties can also be reduced by reducing the number of voids in the expanded PTFE. The combination of techniques of filler addition and reduced number of voids allows a desirable initial level of light transmission with little change in optical properties upon the ingress of liquid into residual voids.

The following example is intended to illustrate, but not limit, the present invention.

EXAMPLE

An architectural fabric was prepared as follows:

THV220 (Dyneon, Inc, Oakdale, Minn.) which was pigmented tan was extruded using a single screw extruder and a slotted die at a temperature of 250 C. It was directed vertically downward into a nip created by two rolls; one being a TEFLON® -sleeved EPDM rubber roll and the other a TEFLON®-coated steel roll. The thickness of the extruded film was 175 micrometers. The EPDM roll had a surface temperature of 90 C, and the steel roll had a surface temperature of 115 C. The surface speed of the rolls was 2.75 meters per minute. Fabric woven of expanded PTFE fiber was obtained from W.L. Gore & Associates, Inc. This fabric was woven in a plain weave, 18 ends by 18 picks per centimeter.

Each end and each pick yarn was composed of two 500 denier expanded PTFE fibers plied together.

The fabric entered the nip over the steel roll and was pressed against the molten THV220 in the nip. The nip force was 130 Newtons per centimeter. The THV220 was pushed into the voids in the fabric by the action of the nip. The resulting THV220 fabric composite was wound onto a roll at the end of the extrusion line.

The aforementioned THV220fabric composite was then run a second time on the extrusion line except that a second coating of molten THV220 pigmented red was applied to the fabric face which was not extruded upon in the first pass. The machine conditions were the same for this second pass as they were for the first pass. This material produced in this example was identified as 360-75. The thickness of the THV220/fabric composite was 0.65 millimeters, and the mass per unit area was 1240 grams per square meter.

Testing

The fabric produced according to the above example was tested for various properties as follows.

(1) Waterproofness

Apparatus:
RO/Distilled water
Thermometer
Low Hydrostatic Pressure Tester (Alfred Suter Co., Ramsey, N.J., Model No. 502 Suter LHPT)
Timer
Water Circulator Test Specimens:
Specimen size: circular sample of 4½ (11.4 cm) diameter.
Specimens per sample: Three.

Conditioning: Condition the specimens at 21±1° C. (70±2° F.), 65±2% RH prior to testing.

Test Procedure:
1. Check the water level in the tank.
2. Add water if the level is too low.
3. Turn the pump on.
4. Check that the water temperature is at 27±3° C. (80±5° F.).
   4.1 Run the motor to heat or add heated water to the tank if the water temperature is too low.
   4.2 Float an ice pack, located in the freezer, in the tank to lower the temperature if the water temperature is too high (or becomes too high while testing), or add cold water.
5. Purge the water lines.
6. Place a specimen face side down under the specimen holder.
7. Clamp the specimen in place.
8. Open the valves to start water flow.
9. Set a timer for 3 minutes.
10. Start the timer when the gauge on the LPHT tester reaches the specified pressure (1.1 psig).
11. Check each specimen for leaks. Samples that leak are reported as failures. Those that do not leak, pass.
    11.1 Failures should only be counted if leaks occur in the test area.
        11.1.1 Drops of water penetrating the specimen at the clamped edge of the specimen or within 0.32 cm (⅛") of this edge shall not be counted.

Three samples of the example material were tested as described above. All three samples passed with no leakage.

(2) Fire Retardance

The example fabric was tested for fire retardance as follows.

Apparatus:

| | |
|---|---|
| Cabinet including Tirrill Burner | Brass weights |
| Metal specimen holder and clips | Scissors or hole punch |
| Specimen mounting block | Butane lighter |
| Timer (tenths of seconds) | Disposable gloves |
| Metric ruler (1 mm graduations) | Gas: methane 99% pure |
| Plastic bag | |

Test Specimens:
Specimen size: 3"×12" with the 12" length parallel to the test direction.
Number of samples: two.

Conditioning: Condition the specimens at 70±2° F., 65±2% RH prior to testing.

Test Procedure:
1. Cut specimens as specified above.
    1.1. Ensure that the gas pressure is 2.5±0.25 psi.
    1.2. Turn power on (control panel on counter).
    1.3. Turn the pilot knob slightly counter-clockwise, so that it is on.
    1.4. Ignite the pilot with the butane lighter.
    1.5. Adjust the pilot size to ⅛ using the pilot knob. Measure the pilot flame from its lowest point to the tip.
    1.6. Set the flame ignition timer to 120 seconds.
    1.7. Turn the flame/fan knob to flame and burn the flame for at least 2 minutes prior to the beginning of each set up and testing session.
    1.9. Adjust the flame height to 1.5" by turning the knob at the bottom of the burner clockwise to increase the height or counter clockwise to decrease the height. The tip of the flame should reach the top point of the flame indicator.
    1.10. Re-set the flame ignition timer to 12 seconds and re-light the flame.
    1.11. Turn the flame/fan knob to fan.
    1.12. Place the metal specimen holder on the mounting block.
    1.13. Align a dummy specimen in the metal holder with the short edge of the dummy aligned with the lower edge of the holder.
    1.14. Close the specimen holder and clamp with the clips at two places on each side making sure the dummy is smooth and flat in the holder.
    1.15. Turn the flame/fan knob to flame.
    1.16. Light the flame with the butane lighter.
    1.17. Immediately turn the flame/fan knob to off.
    1.18. Position the specimen holder securely in the cabinet.
    1.19. Make sure the holder is positioned in the groove of the holder rest at the back of the cabinet and the middle of the lower edge of the specimen is centered ¾" above the burner.
    1.20. Close the cabinet door and the hood sash. Note: The specimen must be tested within 2 minutes of being placed in the cabinet.
    1.21. Turn the flame/fan knob to flame to start the 12-second flame.
    1.22. Once the 12-second flame has extinguished confirm that the pilot light is the proper size.
    1.23. Depress the door release button and allow the cabinet to ventilate for 30 seconds or until all smoke and fumes are removed.

1.24. Adjust the pilot light, if necessary, and repeat steps 1.15 through 1.24 as needed until proper pilot size is maintained.
2. Testing:
   2.1. Place the metal specimen holder on the mounting block.
   2.2. Align the specimen in the metal holder such that the test area does not contain any identification markings when the short edge of the specimen is aligned with the lower edge of the holder.
   2.3. Close the specimen holder and clamp with clips at two places on each side making sure the specimen is smooth and flat in the holder.
   2.4. Turn the flame/fan knob to flame.
   2.5. Light the flame with the butane lighter.
   2.6. Immediately turn the flame/fan knob to off.
   2.7. Position the specimen holder securely in the cabinet.
   2.8. Make sure that the holder is positioned in the groove of the holder rest at the back of the cabinet and that the middle of the lower edge of the specimen is centered ¾" above the burner.
   2.9. Close the cabinet door and the hood. Note: The specimens must be tested within 2 minutes of being place in the cabinet.
   2.10. Turn the flame/fan knob to flame to start the 12-second flame.
   2.11. Determine the after-flame, and after-glow time, and the presence of melting or dripping, after the 12-second flame extinguishes, and record in the lab database.
      2.11.1. After-flame: Using the timer mounted on the hood, measure the number of seconds, to the nearest 0.1 seconds, that the material continues to burn after the igniting flame extinguishes. Do not turn the fan on until the specimen has stopped glowing, regardless of whether or not the after-glow is being measured.
      2.11.2. After-glow: Using the automatic timer, measure the number of seconds, to the nearest 0.1 seconds, that the material glows after the flaming ends. The glow shall not be extinguished even if after-glow time is not being evaluated because of the glow's effect on char length.
      2.11.3. Melt/Drip: Look for signs of melting or dripping.

The example material tested for fire retardance had the following results (Table 1), illustrating that the material was indeed fire retardant.

TABLE 1

Sample: 360-75

| | | A | B | C | Average | Standard Deviation |
|---|---|---|---|---|---|---|
| Warp | Afterflame(sec) | 1.3 | 1.2 | 1.2 | 1.23 | 0.05 |
| | Afterglow(sec) | 0 | 0 | 0 | 0.00 | 0.00 |
| | Melt/Drip | Melt/No Drip | Melt/No Drip | Melt/No Drip | | |
| | Char Length(cm) | 1.4 | 1.55 | 1.85 | 1.60 | 0.19 |
| Fill | Afterflame(sec) | 1.2 | 1.1 | 1 | 1.10 | 0.08 |
| | Afterglow(sec) | 0 | 0 | 0 | 0.00 | 0.00 |
| | Melt/Drip | Melt/No Drip | Melt/No Drip | Melt/No Drip | | |
| | Char Length(cm) | 1.6 | 1.45 | 1.85 | 1.63 | 0.16 |

(3) Seam Strength

Two pieces of the example fabric were placed in overlapping relationship in the warp direction, such that 2.5 inches (6.35 cm) of each piece overlapped. No seam tape was used, nor was any scuffing or abrasion performed on the areas to be welded. The overlap was welded to form a seam with an Aline Welder Model HD-25 at 230 degrees C. for 45 seconds. Strips of the fabric were cut 2 inches (5.08 cm) wide by 14 inches (35.5 cm) long with the long direction perpendicular to the seam. The seam strength was tested by pulling the seam on a tensile tester (Instron Corporation, Norwood Mass., Model 5567) with 4 inch (10.16 cm) gauge length at 2 inches (5.08 cm) per minute extension rate. Five such specimens were produced. The results are tabulated below (Table 2), and indicate a very strong seam was produced using this simple welding technique on the inventive fabric. A seam having a strength of at least 90% of the nominal strength of the fabric is desired.

TABLE 2

| Specimen | Max Force (Lb/2 Inch) | Max Force (Lb/Inch) | Max Force (N/5 cm) | Percent of Nominal Fabric Strength (456 Lb/in - 4000 N/5 cm) |
|---|---|---|---|---|
| 1 | 929 | 465 | 4074 | 102% |
| 2 | 901 | 451 | 3951 | 99% |
| 3 | 868 | 434 | 3806 | 95% |
| 4 | 884 | 442 | 3876 | 97% |
| 5 | 882 | 441 | 3868 | 97% |
| Average | 893 | 446 | 3915 | 98% |
| Std. Dev. | 23.4 | 11.7 | 102.5 | |
| COV | 2.6% | 2.6% | 2.6% | |

As discussed above, the ability of the fabric substrate to resist optical transmission changes as the result of exposure to oils or low surface tension liquids such as isopropyl alcohol (or water in combination with some such substance) is desired. An effective method to determine the resistance of the substrate to optical transmission changes is to measure the optical transmission value before and after exposure to a challenge liquid. The Huygen Optical Transmission Meter Model HTM-1, available from Thwing-Albert Instrument Company of Philadelphia, Pa. USA, was used to measure the optical transmission of several fabric substrates as described below. The Huygen Optical Transmission Meter was set-up and operated per the standard operating instructions supplied by the manufacturer, using the 9 volt dc power supply. In the examples and comparative example below, a fabric was tested without the addition of the THV layer because the optical properties being tested are believed to be unaffected by the presence of the THV layer.

Comparative Example

A fabric was woven from expanded PTFE fiber. The fabric was a plain weave 18 ends by 18 picks per centimeter with each end and pick composed of two 500 denier expanded PTFE fibers plied together, available from W.L. Gore & Associates, Elkton, Md. USA. The optical transmission of the fabric measured to be 47%. A fabric section approximately 4 square centimeters in area was exposed to approximately 0.5 milliliters of isopropyl alcohol through application by an eyedropper. The optical transmission was measured again in the exposed location approximately one minute after exposure to the liquid. The optical transmission had increased significantly to 65% and appeared to be much clearer than the unexposed areas. Application of the isopropyl alcohol thus increased the optical transmission of this Comparative Example by 18%. A separate sample of this fabric was measured to have an optical light-transmission of 43%. Silicon oil was applied to this second sample of fabric and the optical transmission was measured after 1 hour. After application of the silicon oil the light transmission increased significantly to 60% and appeared to be much clearer than the unexposed areas. Application of the silicon oil thus increased the optical transmission of this comparative example by 17%.

Example A

Densified Fiber

A fabric was woven from 1400 denier expanded PTFE fiber. The fabric is a plain weave with 18 ends by 18 picks per centimeter. This fiber is commercially produced by W.L. Gore & Associates, Elkton Md. USA and is identified as Gore part number M1000KTR. This fiber was produced according to the process of U.S. Pat. No. 6,071,452. The fiber produced by this process is translucent in appearance resulting from the densification of the fiber inherent with this process. The density of this fiber is approximately 2.2 grams per cubic centimeter as compared to the density of the fiber in the Comparative Example, which was approximately 1.5 grams per cubic centimeter. The optical transmission of the fabric of this Densified Fiber Example was 66%. When the fabric was exposed to the isopropyl alcohol as in the example above, the optical transmission increased to 69%, and the exposed area appeared visually very similar to the unexposed areas. Application of the isopropyl alcohol thus increased the optical transmission by only 3%, a marked and surprising improvement over the Comparative Example.

Example B

Fiber with Filler

A fabric was woven from expanded PTFE fiber which contained a titianium dioxide pigment approximately 2.0% by weight, produced as taught in Example 1 of U.S. Pat. No. 5,262,234 (except $TiO_2$ was used instead of a conductive filler and the widths adjusted to produce the desired denier). The fabric was a plain weave 18 ends by 18 picks per centimeter with each end and pick composed of two 500 denier expanded PTFE fibers, each fiber filled with a titanium dioxide pigment approximately 2% by weight, plied together. The optical transmission of the fabric measured to be 24%. When the fabric was exposed to the isopropyl alcohol as in the examples above, the optical transmission increased to 27%, and the exposed area appeared visually very similar to the unexposed areas. Application of the isopropyl alcohol thus increased the optical transmission by only 3%, a marked and surprising improvement over the Comparative Example.

Example C

Fiber with Reduced Level of Filler

A Fabric was woven from an expanded PTFE Fiber which contained a titanium dioxide pigment approximately 0.66% by weight fiber produced as taught in U.S. Pat. No. 3,953,566. The resultant fiber was woven in a plain weave 18 ends/cm by 18 picks/cm with each end and pick composed of two 500 denier expanded PTFE fiber, each fiber filled with titanium dioxide approximately 0.66% by weight, plied together. The optical transmission of the fabric constructed from this reduced level of filled fiber was measured to be 32%. When the fabric was exposed to the silicon oil as a challenge liquid, with an effect similar to the IPA in the examples above, the optical light transmission increased to 38%, and the exposed area appeared to be slightly cleared than the unexposed areas. Application of the silicon oil thus increased the optical transmission by 6%, a significant and surprising improvement over the Comparative Example.

Example D

Fiber with Both Filler and Densification

A Fabric was woven from a densified expanded PTFE Fiber which contained a titanium dioxide pigment approximately 0.66% by weight fiber. The fiber was produced as taught in U.S. Pat. No. 3, 953,566, plied and then densified by a combination of heat and tension. The densification was accomplished by passing over a heated plate at a temperature of 450 c with a residence time of 0.8 seconds. The tension was accomplished by having two sets of nip rollers, one before the hot plate and one after. The exit nip rollers were turning at a ratio of 1.06 times the inlet nip rollers. The resultant fiber was woven in a plain weave 18 ends/cm by 18 ends/cm. Each end and pick composed of two 500 denier expanded PTFE fibers, each fiber filled with approximately 0.66% titanium dioxide, plied together and densified. The optical transmission of the fabric constructed from this filled and densified fiber was measured to be 40%. When the fabric was exposed to the silicon oil as in the example above the optical light transmission increased to 41%, and the exposed area appeared visually very similar to the unexposed areas Application of the silicon oil thus increased the optical transmission by 1%, a marked and surprising improvement over the Comparative Example and Example C.

Examples E-G

Several additional trials with variations on the fiber were performed. All fibers were 500 denier, plied and then woven in a plain weave 18 ends per cm by 18 picks per cm. The fibers and Results are described in Table 3 below. Densification unless otherwise noted was performed as described in Example D. The filler when used was titanium dioxide.

TABLE 3

| Designation | Filler loading | Densification residence time | Dry optical transmission | Silicon oil wetted optical transmission | Optical transmission change |
|---|---|---|---|---|---|
| E | 0.33% | 0 (not densified) | 36% | 44% | 8% |
| F | 0.33% | 0.8 sec | 47% | 50% | 3% |
| G | 0% not filled | 0.8 sec | 62% | 73% | 11% |

Discussion of Results

Samples where the fibers of the fabric contain filler but are not densified showed dramatic improvement in optical transmission change as compared to the Comparative Example. Specifically, the optical transmission change for the Comparative Example was 17%. Example B, with a filler loading of 2%, showed an optical transmission change of only 3%. Example C, with a filler loading of 0.66%, showed an optical transmission change of 6%. Example E, with a filler loading of 0.33%, showed an optical transmission change of 8%.

Samples where the fibers of the fabric were densified but not filled also showed dramatic improvement in optical transmission change as compared to the Comparative Example. Example A showed an optical transmission change of only 3%, and Example G showed an optical transmission change of 11%. An advantage of these samples over the samples with filler is that the overall light transmission value is higher (and thus more desirable) with the densified fibers versus the filled fibers. Specifically, while the initial optical transmission values for the filled fibers were 27%, 32%, and 36% for Examples, B, C, and E, respectively, the initial optical transmission values for the densified fibers were 66% and 62% for Examples A and G, respectively.

The inventors then discovered that there is a surprising result obtained when combining the filled fibers and the densified fibers. By far the most dramatic improvement, even when compared to the working examples discussed above, came from the samples using a combination of filler and densification. Example D, with densified fibers having a filler loading of 0.66%, had a relatively high initial optical transmission of 40%, and an optical transmission change of only 1%. Example E, with densified fibers having a filler loading of 0.33%, had a relatively high initial optical transmission of 47%, and an optical transmission change of only 3%.

While particular embodiments of the present invention have been illustrated and described herein, the present invention should not be limited to such illustrations and descriptions. It should be apparent that the changes and modifications may be incorporated and embodied as part of the present invention within the scope of the following claims.

What is claimed is:

1. An architectural fabric consisting of:
   (a) a layer of fabric having a first surface and a second surface and comprising densified essentially non-porous expanded polytetrafluoroethylene fibers; and
   (b) a THV coating disposed on said first surface and extending between and among said fibers from said first surface;
   (c) wherein said fabric has an optical transmission change of 11% or less.

2. An architectural fabric consisting of:
   (a) a layer of fabric having a first surface and a second surface and comprising densified essentially non-porous expanded polytetrafluoroethylene fibers; and
   (b) a THV coating disposed on said first surface and extending between and among said fibers from said first surface;
   (c) wherein said fabric has an optical transmission change of 11% or less;
   (d) wherein said fibers contain a filler.

3. An architectural fabric as defined in claim 2 wherein said filler comprises TiO2.

4. An architectural fabric as defined in claim 2 wherein said filler is present in a non-zero amount of 2.0% or less by weight.

5. An architectural fabric as defined in claim 2 wherein said filler is present in a non-zero amount of 1.0% or less by weight.

6. An architectural fabric as defined in claim 2 wherein said filler is present in an amount of between about 0.3% and about 0.7% by weight.

7. An architectural fabric as defined in claim 2 wherein said filler is present in an amount of about 0.7% by weight.

8. An architectural fabric as defined in claim 2 wherein said filler is present in an amount of about 0.3% by weight.

9. An architectural fabric as defined in claim 2 wherein said architectural fabric is waterproof.

10. An architectural fabric as defined in claim 2 wherein said architectural fabric is flame retardant.

11. An architectural fabric consisting of:
    (a) a layer of fabric having a first surface and a second surface and comprising densified essentially non-porous expanded polytetrafluoroethylene fibers;
    (b) said fibers comprising a filler of TiO2 in an amount of between about 0.3% and 2.0% by weight, and
    (c) a THV coating disposed on said first surface and extending between and among said fibers from said first surface,
    (d) wherein said architectural fabric is waterproof, and
    (e) wherein said architectural fabric is flame retardant;
    (f) wherein said fabric has an optical transmission change of 11% or less.

12. An architectural fabric as defined in claim 1 further comprising a fluoropolymer coating disposed on said second surface and extending between and among said fibers from said second surface.

* * * * *